United States Patent
Katsuma

[19]

[11] Patent Number: 6,084,710
[45] Date of Patent: *Jul. 4, 2000

[54] DIFFRACTION TYPE FILTER HAVING A WAVE LENGTH SELECTIVITY

[75] Inventor: Toshiaki Katsuma, Omiya, Japan

[73] Assignee: Fuji Photo Optical Co., Ltd., Saitama, Japan

[*] Notice: This patent is subject to a terminal disclaimer.

[21] Appl. No.: 09/197,678

[22] Filed: Nov. 23, 1998

[30] Foreign Application Priority Data

Dec. 16, 1997 [JP] Japan ................................. 9-363685

[51] Int. Cl.$^7$ ................................. G02B 5/18; G11B 7/00
[52] U.S. Cl. ...................... 359/569; 359/566; 359/571; 369/112
[58] Field of Search ................................. 359/569, 568, 359/566, 565, 562, 559, 571, 574; 369/44.37, 112

[56] References Cited

U.S. PATENT DOCUMENTS

| | | | |
|---|---|---|---|
| 4,940,308 | 7/1990 | Debesis | 359/569 |
| 5,682,265 | 10/1997 | Farn et al. | 359/569 |
| 5,696,750 | 12/1997 | Katayama | 369/112 |
| 5,815,293 | 9/1998 | Komma et al | 359/569 |

*Primary Examiner*—Cassandra Spyrou
*Assistant Examiner*—Jennifer Winstedt
*Attorney, Agent, or Firm*—Ronald R. Snider; Snider & Associates

[57] ABSTRACT

A diffraction grating with a wavelength selectivity having one sectional side formed like a step is disposed at a marginal region of a filter, and only a wavelength of light whose luminous flux diameter is to be narrowed is diffracted sideways at the diffraction grating, whereby the luminous flux diameter of irradiation light is changed by a simple configuration without complicating an electric control system or restricting the direction of vibration of the irradiation light, while reducing noise. Disposed on a glass substrate 10 are a first region 11 having no diffraction grating 12A, and a second region 12 having diffraction gratings 12A constituted by long protrusions arranged in parallel at a predetermined pitch, each protrusion being continuous in one direction and having one sectional side formed like a step. The thickness (height) of one step in each diffraction grating 12A is set to such a value that the ratio of 1st-order diffracted light is made greater for the light at a wavelength of 780 nm employed for CD-R, whereas the ratio of 0-order diffracted light becomes substantially 100% for the light at a wavelength of 635 nm employed for DVD.

5 Claims, 5 Drawing Sheets

−1ST ORDER +1ST ORDER DIFFRACTED DIFFRACTED LIGHT LIGHT

+1ST ORDER −1ST ORDER DIFFRACTED DIFFRACTED LIGHT LIGHT

DIFFRACTION TYPE FILTER HAVING A WAVE LENGTH SELECTIVITY

RELATED APPLICATIONS

This application claims the priority of Japanese Patent Application No. 9-363685 filed on Dec. 16, 1997, which is incorporated herein by reference.

BACKGROUND OF THE INVENTION

1. Field of the Invention

The present invention relates to a diffraction type filter used in an optical pickup apparatus which is commonly usable for two or more kinds of optical recording media. In the case where the optical recording media are irradiated with light beams having wavelengths different from each other depending on the kinds of optical recording media, the diffraction type filter can efficiently converge the light beams onto their corresponding optical recording media.

2. Description of the Prior Art

Recently, a variety of optical recording media have been under development, and optical pickup apparatus which can record and reproduce a plurality of kinds of optical recording media in common have been known.

For example, an optical pickup apparatus may be used for recording and reproducing both DVD (digital video disk) and CD-R (write-once optical disk). In this case, the value of numerical aperture NA for each recording medium is defined according to a standard, such that brightness is necessary for the numerical aperture for DVD, which is 0.6, for example, whereas brightness is suppressed in the numerical aperture for CD-R, which is 0.45., for example.

As a consequence, when an objective lens is to be used for recording and reproducing both of the above-mentioned media, it becomes necessary to switch the numerical aperture of the pickup optical system between their recording/reproducing operations.

Typically, the size of numerical aperture is switched by changing the luminous flux diameter. For example, a liquid crystal shutter may be driven in synchronization with the timing at which the recording/reproducing operations for both media are switched, so as to change the diameter of the luminous flux passing through the shutter.

When a liquid crystal shutter is used for changing the luminous flux diameter, an electric control system is needed for controlling the liquid crystal shutter, thereby increasing the manufacturing cost.

Also, since only a polarized light component having a predetermined direction of vibration can pass through the liquid crystal shutter, it is necessary to carry out designing in view of the direction of vibration of the irradiation light in order for the light to efficiently pass therethrough, whereby the degree of flexibility in designing is restricted.

In the above-mentioned two kinds of optical recording media, while visible light at about 635 nm, for example, is employed for DVD in order to improve its recording density, near infrared light at about 780 nm is needed for CD-R since it has no sensitivity to light in the visible region. As a consequence, an optical pickup apparatus which can commonly be used for both of them would be of a so-called two-wavelength beam system using two different wavelengths of light as the irradiation light. Hence, the luminous flux diameters of these two kinds of irradiation light may be changed by means of their difference in wavelength.

SUMMARY OF THE INVENTION

In view of the circumstances mentioned above, it is an object of the present invention to provide a diffraction type filter having a simple configuration and yielding less noise, which can change the luminous flux diameter of irradiation light without complicating its electric control system or restricting the direction of vibration of the irradiation light.

The diffraction type filter in accordance with the present invention is a diffraction type filter, having a wavelength selectivity, disposed in a luminous flux; the filter comprising a first region constituting a center portion of the filter, and a second region positioned outside the center portion of the filter, the first region exhibiting no diffracting action for two light beams respectively having wavelengths of $\lambda_1$ and $\lambda_2$ which are different from each other, the second region being formed with a diffraction grating having a diffracting action for only one of the two light beams respectively having wavelengths of $\lambda_1$ and $\lambda_2$, the diffraction grating having a plurality of protrusions disposed in parallel at a predetermined pitch, each protrusion being continuous in one direction and having one sectional side formed like a step.

Preferably, the luminous flux incident on the diffraction type filter is substantially a parallel luminous flux.

Preferably, one stage height h of the diffraction grating is configured so as to satisfy the following conditional expressions (1) and (2):

$$h = L\lambda_1/(n_1-1) \quad (1)$$

$$h = M\lambda_2/(n_2-1) + K\lambda_2/2(n_2-1) \quad (2)$$

where $\lambda_1$ and $\lambda_2$ are the respective wavelengths of the two incident light beams;

$n_1$ is the refractive index of the diffraction grating with respect to light having a wavelength of $\lambda_1$;

$n_2$ is the refractive index of the diffraction grating with respect to light having a wavelength of $\lambda_2$;

L is a positive integer;

M is the maximum value among 0 and positive integers satisfying a conditional expression of $h > M\lambda_2/(n_2-1)$; and K is a value at least 0.27 but not greater than 1.73.

Preferably, the number of stages in the step is 3. Here, the number of stages refers to the total number of stages counting the uppermost and intermediate stages without including the surface on the substrate.

The diffraction type filter may be disposed in front of a convergent lens for converging the luminous flux.

The diffraction type filter may be configured such that the luminous flux is at a position where at least two kinds of optical recording media are placed, at least one of at least two kinds of optical media is recorded or reproduced with the light beam having a wavelength of $\lambda_1$, the rest is recorded or reproduced with the light beam having a wavelength of $\lambda_2$ different from the wavelength of $\lambda_1$, and the diffraction grating diffracts only one of the two light beams having different wavelengths into a direction different from the light-converging direction of the convergent lens.

DESCRIPTION OF THE PREFERRED EMBODIMENTS

In the following, embodiments of the present invention will be explained with reference to the accompanying drawings.

Figure 8:
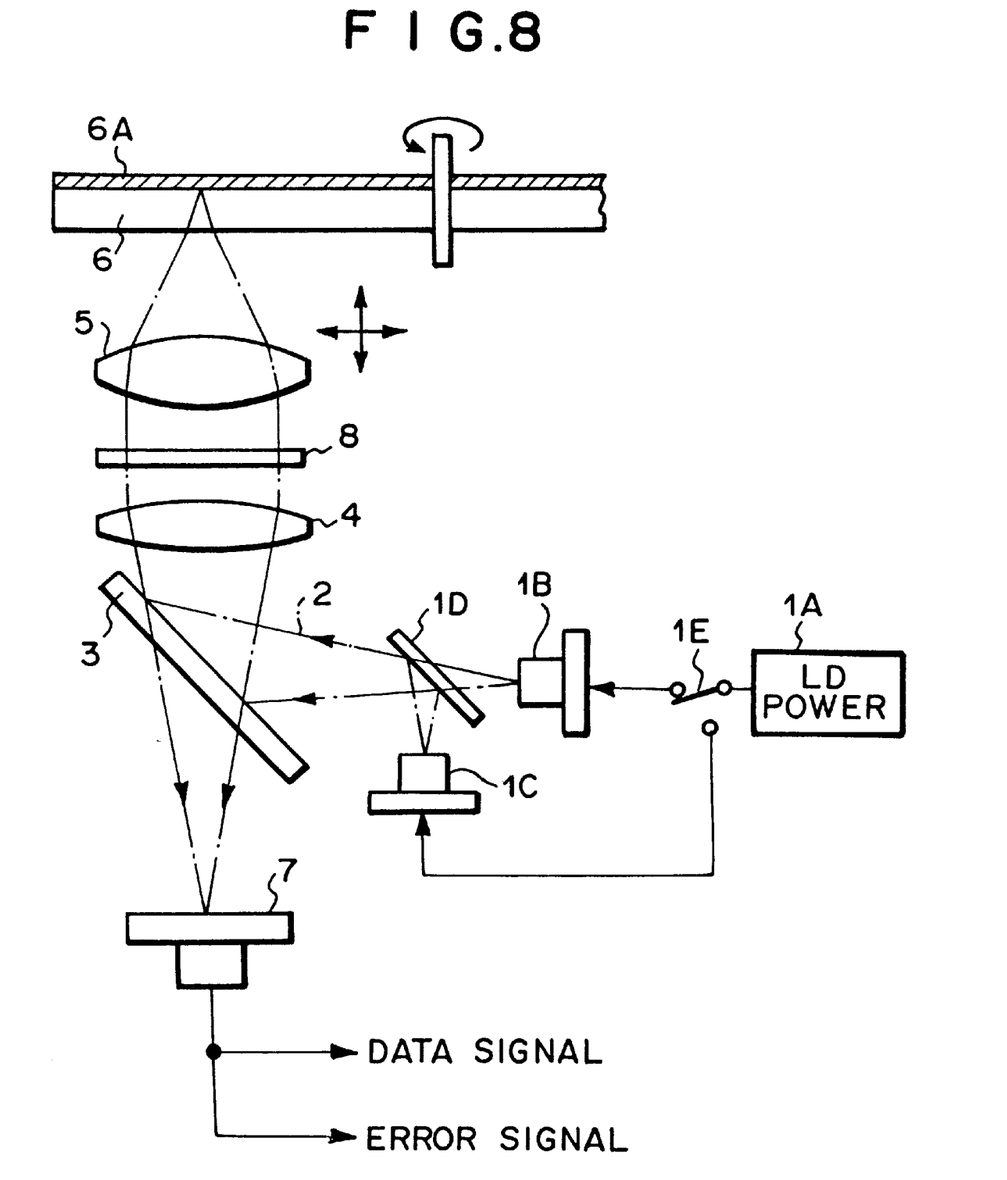
FIG. 8 is a schematic view showing an optical pickup apparatus employing the diffraction type filter shown in FIG. 1.

First, an optical pickup apparatus employing a diffraction type filter in accordance with an embodiment of the present invention will be explained with reference to FIG. 8.

In this optical pickup apparatus, laser light beams 2 emitted from semiconductor lasers 1B and 1C when electric power is supplied thereto from an LD power supply 1A are reflected by a half mirror 3, are turned into parallel light by a collimator lens 4, and then are changed into convergent light by an objective lens 5 so as to irradiate a recording area 6A of an optical disk 6. Here, the semiconductor laser 1B is a light source for emitting laser light at a wavelength of 780 nm in the near infrared region for CD-R (write-once optical disk), whereas the semiconductor laser 1C is a light source for emitting laser light in the visible region, e.g., at a wavelength of 635 nm, for DVD (digital video disk). By way of a half mirror 1D, one of the laser light beams 2 emitted from the semiconductor lasers 1B and 1C irradiates the half mirror 3. A selector switch 1E is disposed between the LD power supply 1A and the semiconductor lasers 1B and 1C, such that electric power is supplied to one of the semiconductor lasers 1B and 1C as the selector switch 1E is operated.

In the recording area 6A, pits carrying signal information are arranged in a track. Of the laser light beams 2, the reproducing light component reflected from the recording area 6A, in a state carrying the signal information, is made incident on the half mirror 3 by way of the objective lens 5 and collimator lens 4, and then passes through the half mirror 3 so as to enter a photodiode 7 which has been divided into four parts. In the photodiode 7, the respective quantities of light received at positions of the four divided diode parts are operated, so as to yield a data signal and respective error signals for focusing and tracking.

As the half mirror 3 is inserted with an inclination of 45° into the optical path of the light returning from the optical disk 6, it would yield a function equivalent to that of a cylindrical lens. Thus, the light beam passing through the half mirror 3 exhibits astigmatism, whereby the amount of error in focusing would be determined in response to the form of the beam spot of returned light on the four-divided photodiode 7. The collimator lens 4 may be omitted according to circumstances. A diffraction grating may further be inserted between the semiconductor laser 1B, 1C and the half mirror 3, so as to detect tracking errors by means of three beams.

This optical pickup apparatus is constituted such as to be capable of recording and reproducing signals on any optical disk 6 of CD-R and DVD.

While the geometrical thickness values of CD-R and DVD are standardized at 1.2 mm and 0.6 mm, respectively, focusing can securely be effected for any of these optical disks 6.

Both CD-R and DVD have a protective sheet made of PC (polycarbonate; refractive index $n_D$=1.514).

For the CD-R and DVD, the optical system requires different numerical apertures NA, which are set to 0.45 and 0.6, respectively.

Hence, when the same objective lens 5 is used as with this optical pickup apparatus, it is necessary to switch NA, depending on whether CD-R or DVD is recorded/reproduced, to the value corresponding to the recording medium.

Therefore, in this optical pickup apparatus, a diffraction type filter 8 adapted to narrow the luminous flux diameter of the laser light from the light source is placed between the collimator lens 4 and the objective lens 5 only when recording/reproducing CD-R, thereby switching the NA of the optical system in response to the kinds of optical disks 6 to be recorded/reproduced.

Figure 1:
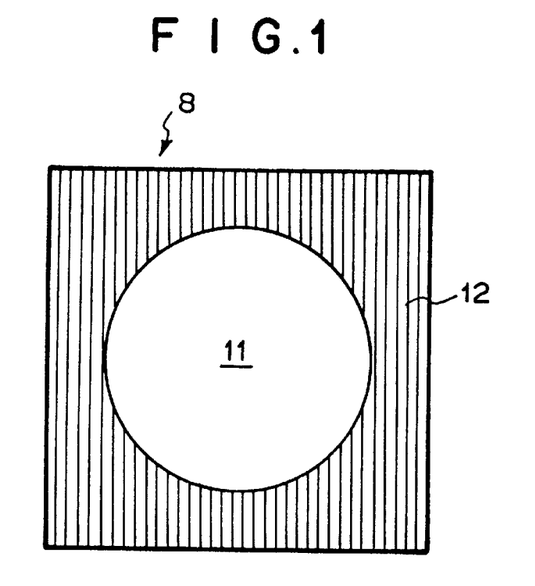
FIG. 1 is a plan view showing a diffraction type filter in accordance with an embodiment of the present invention.

Namely, as shown in FIG. 1, the diffraction type filter 8 comprises a first region 11 made of a central circular portion, and a second region 12 constituting a marginal portion thereof. The first region 11 transmits therethrough any wavelength of light, whereas the second region 12 is formed with a diffraction grating having such a wavelength selectivity that light at a wavelength of 635 nm is transmitted therethrough and that the major part of light at a wavelength of 780 nm is diffracted sideways.

Figure 2A:
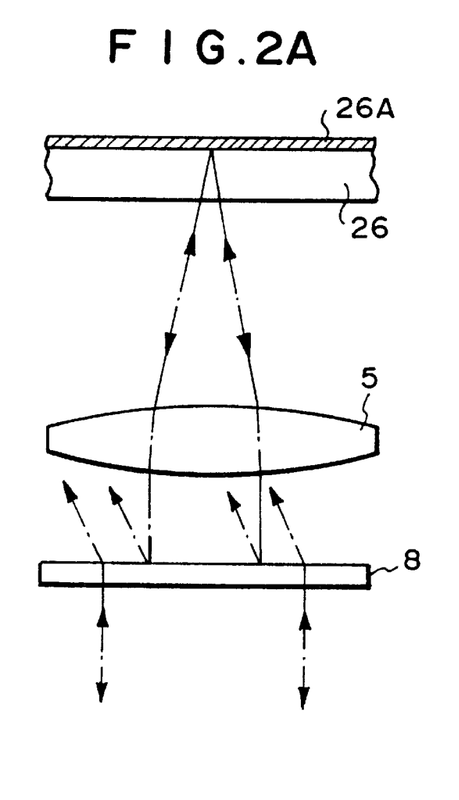
FIGS. 2A and 2B are schematic views for explaining operations of the diffraction type filter shown in FIG. 1.

The operation of the diffraction type filter 8 will now be explained with reference to FIGS. 2A and 2B. Namely, in the case where a CD-R 26 is placed at a predetermined position (on a turntable) so as to be recorded/reproduced as shown in FIG. 2A, the laser light beam 2 at a wavelength of 780 nm from the semiconductor laser 1B would be made incident on the diffraction type filter 8 while being in substantially a parallel light state. Here, since the diameter of the incident laser light beam 2 is set larger than that of the first region 11 in the diffraction type filter 8, the marginal portion of the light beam would be made incident on the second region 12 of the diffraction type filter 8.

Of the light beam, the center portion incident on the first region 11 passes through the diffraction type filter 8 as it is, whereas the marginal portion incident on the second region 12 is diffracted sideways on both sides due to the action of the diffraction grating in the second region 12. As a consequence, the laser light beam 2 effectively contributing to recording/reproducing in the recording area 26A of the CD-R 26 is only the part made incident on the first region 11 of the diffraction type filter 8, whereby the beam diameter would be substantially narrowed, thus allowing the numerical aperture NA to decrease.

The diffracting action in the second region 12 with respect to light at a wavelength of 780 nm is such that the ratio of the 1st-order diffracted light becomes greater than that of the 0-order diffracted light.

Figure 2B:
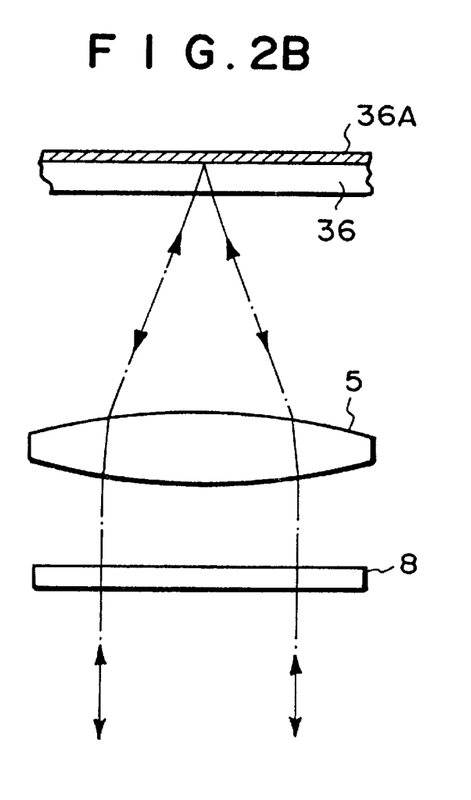

In the case where a DVD 36 is placed at a predetermined position (on a turntable) so as to be recorded/reproduced as shown in FIG. 2B, on the other hand, the laser light beam 2 at a wavelength of 635 nm from the semiconductor laser 1C would be made incident on the diffraction type filter 8 while being in substantially a parallel light state. Here, though the diameter of the incident laser light beam 2 is set larger than that of the first region 11 in the diffraction type filter 8, the diffraction grating in the second region 12 does not exhibit any diffracting action with respect to the light at a wavelength of 635 nm (the ratio of 0-order diffracted light is substantially 100%), thus allowing the marginal portion of the light beam to pass through the diffraction type filter 8 as it is, whereby the light beam 2 is converged onto the recording area 36A of the DVD 36 without changing its diameter.

Here, the diffracting action in the second region 12 with respect to light at a wavelength of 635 nm is such that the ratio of 0-order diffracted light is substantially 100%, whereas that of the 1st-order and higher diffracted light is substantially 0%.

Figure 3:
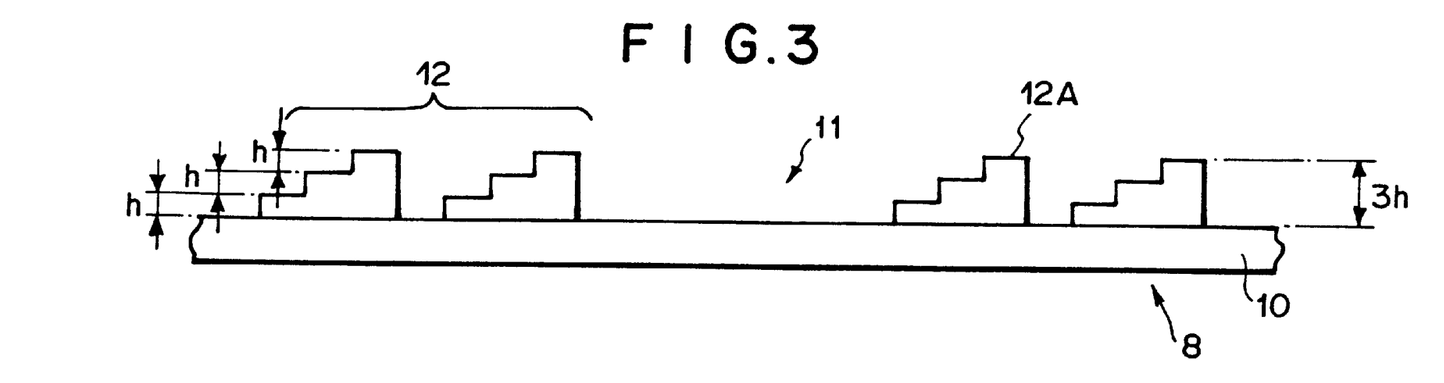
FIG. 3 is a sectional view showing the form of the diffraction type filter shown in FIG. 1.

FIG. 3 shows a sectional configuration of the diffraction type filter 8, in which the first region 11 having no diffraction grating, and the second region 12 having diffraction gratings 12A constituted by long protrusions arranged in parallel at a predetermined pitch, each protrusion being continuous in one direction and having one sectional side formed like a step, are formed on a glass substrate 10.

The second region 12 is provided with the diffraction gratings 12A constituted by a plurality of the long protrusions arranged in parallel at a predetermined pitch. The pitch length is set within the range where a diffraction phenomenon occurs while productivity is favorable, e.g., 10 to 20 μm.

The number of stages in the step is set to 3. The height h of each step is set to such a value that the ratio of 1st-order diffracted light is made greater for the light at a wavelength of 780 nm employed for CD-R, whereas the ratio of 0-order diffracted light becomes substantially 100% for the light at a wavelength of 635 nm employed for DVD.

Namely, the following conditional expressions (1) and (2) are satisfied:

$$h = L\lambda_1/(n_1-1) \quad (1)$$

$$h = M\lambda_2/(n_2-1) + K\lambda_2/2(n_2-1) \quad (2)$$

where $\lambda_1$ and $\lambda_2$ are the respective wavelengths of the two incident light beams;

$n_1$ is the refractive index of the diffraction grating with respect to light having a wavelength of $\lambda_1$;

$n_2$ is the refractive index of the diffraction grating with respect to light having a wavelength of $\lambda_2$;

L is a positive integer;

M is the maximum value among 0 and positive integers satisfying a conditional expression of $h > M\lambda_2/(n_2-1)$; and K is a value at least 0.27 but not greater than 1.73.

The above-mentioned conditional expression (1) defines a condition for the diffraction efficiency of 0-order diffracted light to become 100% for the light at a wavelength of $\lambda_1$ (light at a wavelength of 635 nm for DVD), whereas the above-mentioned conditional expression (2) is a condition for the diffraction efficiency of 1st-order diffracted light to become higher than that of 0-order diffracted light for the light at a wavelength of $\lambda_2$ (light at a wavelength of 780 nm for CD).

In the above-mentioned conditional expression (2), as the value of K is closer to 0.5, 1.0, or 1.5, the diffraction efficiency of 0-order diffracted light becomes smaller. When K=0.5, 1.0, or 1.5, the diffraction efficiency of 0-order diffracted light becomes 0. The −1st-order diffracted light is maximized when K=0.5, whereas +1st-order diffracted light is maximized when K=1.5.

As the cross section of each diffraction grating 12A is thus not shaped into a simple rectangular form but provided with a step-like portion on one side, one of ±1st-order diffracted light components may be outputted alone therefrom when the value of K is appropriately set. Consequently, the arrangement and size of each member can be contrived, so as to prevent the diffracted light from being incident on the objective lens and thereby causing noise.

Figure 4:
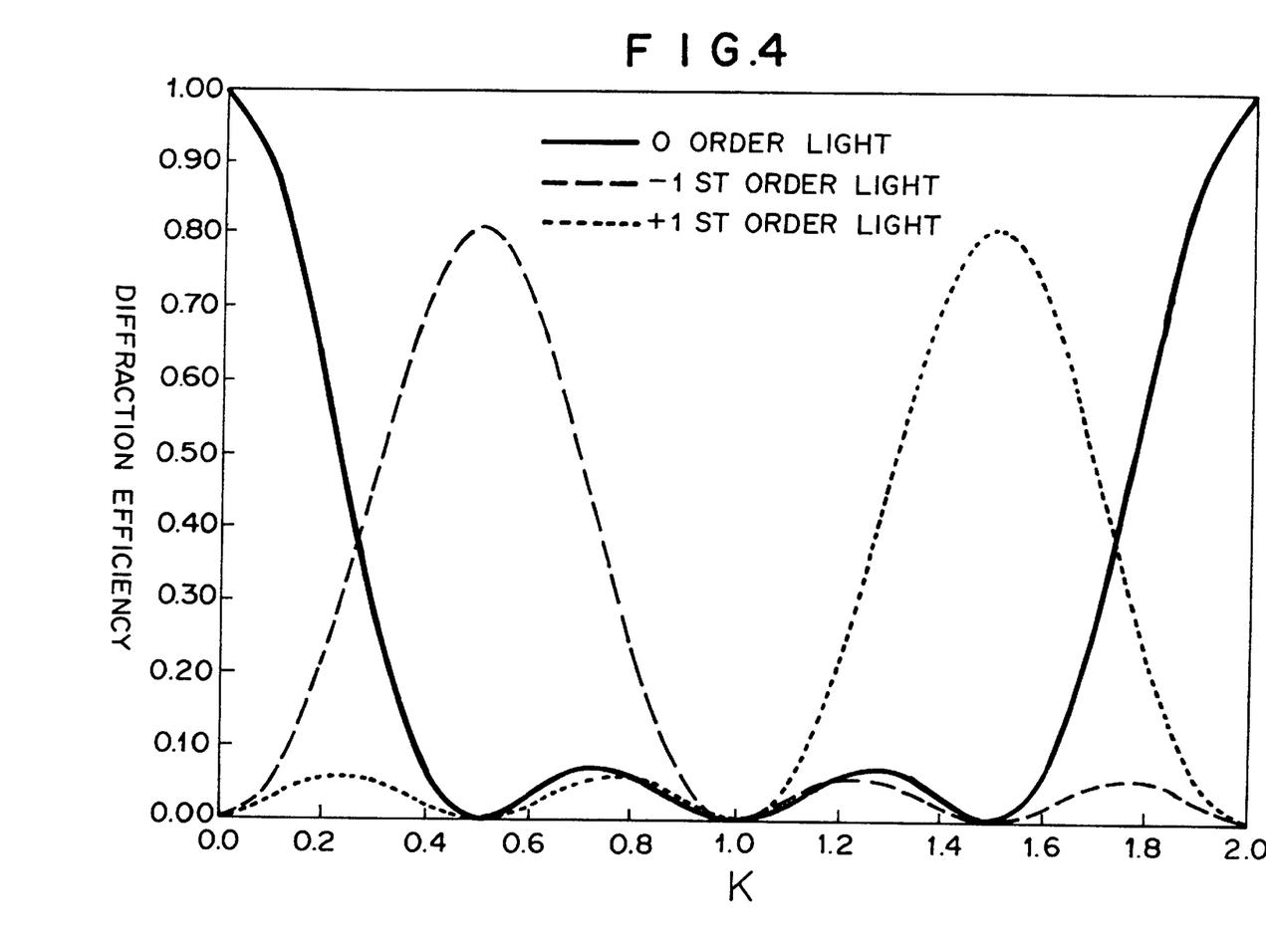
FIG. 4 is a graph showing the diffraction efficiency of the diffraction grating shown in FIG. 3.

FIG. 4 shows how the ratios of 0-order diffracted light and ±1st-order diffracted light change in response to the value of K when the above-mentioned conditional expression (2) is used, indicating that the ratio of ±1st-order diffracted light is not smaller than that of 0-order diffracted light within the range of $0.27 \leq K \leq 1.73$.

Thus, while the diffraction grating 12A functions to change the respective diffraction efficiencies of 0-order diffracted light and ±1st-order diffracted light, according to the value of K, for the light incident thereon from the rear side of the diffraction type filter 8, the diffraction efficiency of −1st-order diffracted light or +1st-order diffracted light would become greater than that of 0-order diffracted light when K is at least 0.27 but not greater than 1.73, whereby the luminous flux diameter can substantially be reduced.

The diffracting grating 12A is formed as titanium dioxide ($TiO_2$) is deposited on the glass substrate 10. Titanium dioxide exhibits a refractive index of 2.349 for light at a wavelength of 635 nm and a refractive index of 2.299 for light at a wavelength of 780 nm.

Figure 5:
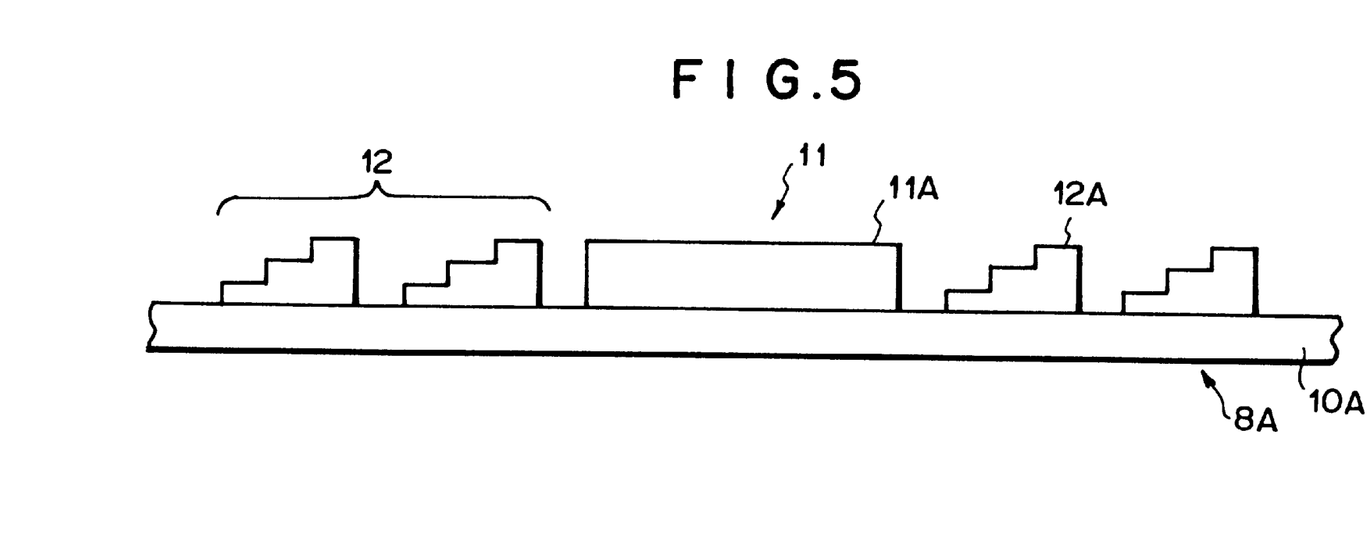
FIG. 5 is a sectional view showing the form of the diffraction type filter in accordance with an embodiment different from that shown in FIG. 1.

A protrusion 11A shown in FIG. 5 may be formed at the first region 11 on glass substrate 10A. In this case, the height and material thereof are made similar to those of the diffraction grating 12A. With no diffraction phenomenon occurring in the first region 11, effects similar to those in the above-mentioned embodiment can be obtained in the case of this diffraction type filter 8A as well.

Figure 6:
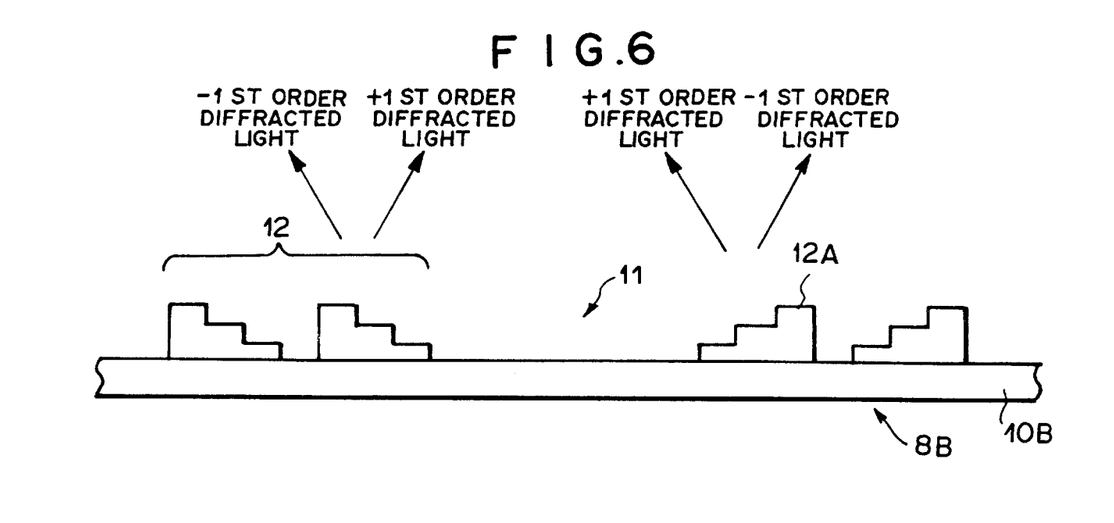
FIG. 6 is a sectional view showing the form of the diffraction type filter in accordance with an embodiment different from those shown in FIGS. 1 and 5.

FIG. 6 shows another embodiment of the diffraction type filter in accordance with the present invention, in which the step portion of each diffraction grating 12A is formed on the side closer to the first region 11 on glass substrate 10B, such that the respective step portions of the diffraction gratings 12A face each other, with the virtual center line of the diffraction type filter 8B acting as substantially a center of symmetry.

In the diffraction grating 12A having such a step-like portion, letting the 1st-order diffracted light diffracted so as to incline toward the step side with respect to the light incident direction be +1st-order diffracted light, and the 1st-order light diffracted so as to incline toward the side opposite to the step side be −1st-order diffracted light, as can be seen from FIG. 4, the −1st-order diffracted light diffracted toward the outside of the diffraction type filter 8B becomes greater when the above-mentioned K is within the range of 0.27 to 1.0, whereas the +1st-order diffracted light diffracted toward the inside of the diffraction type filter 8B becomes greater when the above-mentioned K is within the range of 1.0 to 1.73.

In either case, since the diffraction efficiency for 0-order diffracted light is made smaller, the ratio by which the light from the second region 12 contributes to the recording/reproducing of CD-R becomes smaller. In particular, when the above-mentioned K is set within the range of 0.27 to 1.0, so that the diffraction efficiency of −1st-order diffracted light becomes greater than that of +1st-order diffracted light, the ratio of diffracted light incident within the objective lens 5 can be made smaller. As a consequence, the light which may become noise can be reduced.

Figure 7:
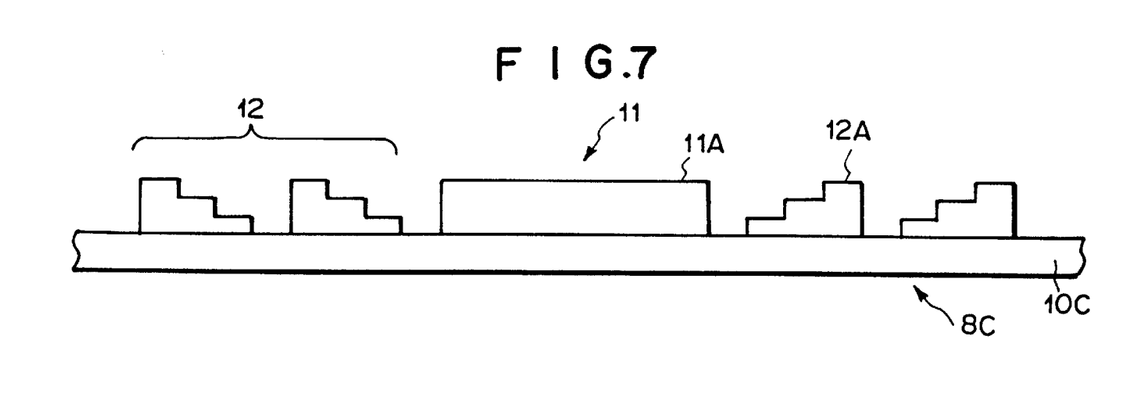
FIG. 7 is a sectional view showing the form of the diffraction type filter in accordance with an embodiment different from those shown in FIGS. 1, 5 and 6.

Also, in the diffraction type filter 8B shown in FIG. 6, the first region 11 may be formed with the protrusion 11A on glass substrate 10C as shown in FIG. 7 (diffraction type filter 8C).

The sizes of the beam diameters of two laser light beams 2 having different wavelengths at the time when they are incident on the diffraction type grating 8, 8A, 8B, 8C may appropriately be set as long as their diameters are greater than the diameter of the first region 11.

Without being restricted to the above-mentioned embodiments, the diffraction type filter in accordance with the present invention can be modified in various manners. For example, plastic materials may be used as a material for forming the substrate, whereas various other materials such as metals, metal oxides, and nonmetallic materials may be used as a material for forming the diffraction grating. Also, the substrate and the diffraction grating may be integrally molded from plastics.

Also, contrary to the embodiment of FIG. 6, the back portions (parts opposite to the step-like portions) of diffraction gratings 12A may face each other, with the virtual center line of the diffraction type filter 8B acting as a center of symmetry. In this case, when the above-mentioned K is set within the range of 1.0 to 1.73, so that the diffraction efficiency of +1st-order diffracted light is greater than that of −1st-order diffracted light, the ratio of the diffracted light incident within the objective lens 5 can be made smaller.

The number of stages of the step can also be set to 2 or 4 or more.

The technique of forming the diffraction grating is not restricted to deposition, but various techniques such as sputtering, plating, and roll coating may be used as well.

When the present invention is applied to an optical pickup apparatus, the optical recording media to be recorded/reproduced are not limited to DVD and CD-R. The present invention is also applicable to any case where two types of optical recording media which are different from each other in their specifications of usable wavelength region and NA are recorded/reproduced by means of a common optical pickup apparatus.

Further, the value of L in the above-mentioned conditional expression (1) may be set to a value different from integers within the range not problematic in practice, such that K is set to a value at least 0.27 but not greater than 1.73.

In the following, the diffraction type filter in accordance with the present invention will further be explained with reference to Examples employing specific values.

EXAMPLE 1

The material for forming the diffraction grating was titanium dioxide (TiO2), whereas the wavelength $\lambda_1$ of light irradiating DVD was set to 635 nm. As a consequence, the refractive index $n_1$ of titanium dioxide with respect to this light became 2.349. Letting L=8 in the above-mentioned conditional expression (1), the stage height h of one stage in the diffraction grating became 3.76575 μm.

Here, letting the wavelength $\lambda_2$ of light irradiating CD-R be 780 nm, the refractive index of titanium dioxide with respect to this light was 2.299.

Also, in this case, M=6 and K=0.543 in the above-mentioned conditional expression (2).

Here, the diffraction efficiency for the light at a wavelength of 635 nm was such that the ratio of 0-order diffracted light was 100%.

For the light at a wavelength of 780 nm, the ratio of 0-order diffracted light was 0.8%, whereas the ratio of −1st-order diffracted light was 79.3%.

EXAMPLE 2

Though the material for forming the diffraction grating, the wavelength $\lambda_1$ of light irradiating DVD, and the refractive index $n_1$ of the material were the same as those in Example 1, L=4 was set in the above-mentioned conditional expression (1). As a consequence, the stage height h of one stage in the diffraction grating became 1.88288 μm.

Letting the wavelength $\lambda_2$ of light irradiating CD-R be the same as that in Example 1, M=3 and K=0.271 in conditional expression (2).

Here, the diffraction efficiency for the light at a wavelength of 635 nm was such that the ratio of 0-order diffracted light was 100%.

For the light at a wavelength of 780 nm, the ratio of 0-order diffracted light was 35.9%, whereas the ratio of −1st-order diffracted light was 40.3%.

EXAMPLE 3

Though the material for forming the diffraction grating, the wavelength $\lambda_1$ of light irradiating DVD, and the refractive index $n_1$ of the material were the same as those in Example 1, L=3 was set in the above-mentioned conditional expression (1). As a consequence, the stage height h of one stage in the diffraction grating became 1.41216 μm.

Letting the wavelength $\lambda_2$ of light irradiating CD-R be the same as that in Example 1, M=2 and K=0.704 in conditional expression (2).

Here, the diffraction efficiency for the light at a wavelength of 635 nm was such that the ratio of 0-order diffracted light was 100%.

For the light at a wavelength of 780 nm, the ratio of 0-order diffracted light was 7.2%, whereas the ratio of −1st-order diffracted light was 47.1%.

EXAMPLE 4

Though the material for forming the diffraction grating, the wavelength $\lambda_1$ of light irradiating DVD, and the refractive index $n_1$ of the material were the same as those in Example 1, L=1 was set in the above-mentioned conditional expression (1). As a consequence, the stage height h of one stage in the diffraction grating became 0.47072 μm.

Letting the wavelength $\lambda_2$ of light irradiating CD-R be the same as that in Example 1, M=0 and K=1.568 in conditional expression (2).

Here, the diffraction efficiency for the light at a wavelength of 635 nm was such that the ratio of 0-order diffracted light was 100%.

For the light at a wavelength of 780 nm, the ratio of 0-order diffracted light was 2.7%, whereas the ratio of +1st-order diffracted light was 76.6%.

EXAMPLE 5

Though the material for forming the diffraction grating, the wavelength $\lambda_1$ of light irradiating DVD, and the refractive index $n_1$ of the material were the same as those in Example 1, L=10 was set in the above-mentioned conditional expression (1). As a consequence, the stage height h of one stage in the diffraction grating became 4.70719 μm.

Letting the wavelength $\lambda_2$ of light irradiating CD-R be the same as that in Example 1, M=7 and K=1.679 in conditional expression (2).

Here, the diffraction efficiency for the light at a wavelength of 635 nm was such that the ratio of 0-order diffracted light was 100%.

For the light at a wavelength of 780 nm, the ratio of 0-order diffracted light was 21.7%, whereas the ratio of +1st-order diffracted light was 53.7%.

EXAMPLE 6

Though the material for forming the diffraction grating, the wavelength $\lambda_1$ of light irradiating DVD, and the refractive index $n_1$ of the material were the same as those in Example 1, L=6 was set in the above-mentioned conditional expression (1). As a consequence, the stage height h of one stage in the diffraction grating became 2.82431 μm.

Letting the wavelength $\lambda_2$ of light irradiating CD-R be the same as that in Example 1, M=4 and K=1.407 in conditional expression (2).

Here, the diffraction efficiency for the light at a wavelength of 635 nm was such that the ratio of 0-order diffracted light was 100%.

For the light at a wavelength of 780 nm, the ratio of 0-order diffracted light was 3.0%, whereas the ratio of +1st-order diffracted light was 72.8%.

As explained in the foregoing, in the diffraction type filter in accordance with the present invention, a diffraction grating, having a wavelength selectivity, constituted by a plurality of protrusions disposed in parallel at a predetermined pitch, each protrusion being continuous in one direction and having one sectional side formed like a step, is disposed at a marginal region of the filter, such as to diffract sideways only a wavelength of light whose luminous flux diameter is to be narrowed.

As a consequence, of the light irradiating this diffraction type filter, a wavelength of light whose luminous flux diameter is not needed to be narrowed is transmitted therethrough with its luminous flux diameter unchanged, thereby maintaining the NA of the optical system at a large value. On the other hand, for a wavelength of light whose luminous flux diameter is to be narrowed, only the luminous flux portion irradiating the center part of the filter is transmitted therethrough, so as to narrow the luminous flux diameter, thus allowing the optical system to have a smaller value of NA. Also, since one sectional side of the diffraction grating is formed like a step, one of ±1st-order diffracted light components may be outputted alone. Therefore, the design of the optical system can be contrived, so as to reduce the ratio of diffracted light incident on the convergent lens.

Hence, in the optical pickup apparatus commonly used for DVD and CD-R in which it is necessary to switch the size of NA, the present invention taking account of the fact that the wavelengths of light to be used for the respective optical recording media are different from each other is quite effectively employed. Namely, NA can be switched so as to correspond to each optical recording medium when the diffraction type filter in accordance with the present invention is simply inserted at a predetermined position, while substantially using the configuration of the conventional optical pickup apparatus. Consequently, without necessitating an electric control system for controlling a liquid crystal panel, which is required when changing the luminous flux diameter by means of a liquid crystal shutter, the manufacturing cost can be reduced. Also, there is no risk of the direction of vibration of irradiation light being restricted such as to lower the degree of flexibility in designing. Further, noise can be reduced. Hence, the practical value of the present invention is quite high.

What is claimed is:

1. A diffraction type filter, having a wavelength selectivity disposed in a luminous flux; said filter comprising a first region constituting a center portion of said filter, and a second region positioned outside the center portion of said filter, said first region exhibiting no diffracting action for two light beams respectively having wavelengths of $\lambda_1$ and $\lambda_2$ which are different from each other, said second region being formed with a diffraction grating having a diffracting action for only one of said two light beams respectively having wavelengths of $\lambda_1$ and $\lambda_2$, said predetermined pitch, each protrusion being continuous in one direction and having one sectional side formed like a step, wherein one stare height h of said diffraction satisfies the following conditional expressions (1) and (2):

$$h=L\lambda_1/(n_1-1) \quad (1)$$

$$h=M\lambda_2/(n_2-1)+K\lambda_2/2(n_2-1) \quad (2)$$

where $\lambda_1$ and $\lambda_2$ are the respective wavelengths of the two incident light beams, $n_1$ is the refractive index of the diffraction grating with respect to light having the wavelength of $\lambda_1$;

$n_2$ is the refractive index of the diffraction grating with respect to light having the wavelength of $\lambda_2$;

L is a positive integer;

M is a maximum value among 0 and positive integers satisfying a conditional expression of $h>M\lambda_2/(n_2-1)$; and K is a value at least 0.27 but not greater than 1.73.

2. A diffraction type filter according to claim 1, wherein the luminous flux incident on said diffraction type filter is substantially a parallel luminous flux.

3. A diffraction type filter according to claim 1, wherein a number of stages in said step is 3.

4. A diffraction type filter according to claim 1, wherein said diffraction type filter is disposed in front of a convergent lens for converging said luminous flux.

5. A diffraction type filter according to claim 4, wherein said luminous flux is converged at a position where at least two kinds of optical recording media are placed, at least one of at least two kinds of optical media being recorded or reproduced with the light beam having said wavelength of $\lambda_1$, the rest being recorded or reproduced with the light beam having said wavelength of $\lambda_2$ different from the wavelength of $\lambda_1$, said diffraction grating diffracting only one of said two light beams having different wavelengths into a direction different from a light-converging direction of said convergent lens.

* * * * *

UNITED STATES PATENT AND TRADEMARK OFFICE
CERTIFICATE OF CORRECTION

PATENT NO. : 6,084,710
DATED : July 4, 2000
INVENTOR(S) : Toshiaki Katsuma

Page 1 of 1

It is certified that error appears in the above-identified patent and that said Letters Patent is hereby corrected as shown below:

<u>Column 10,</u>
Line 21, change "stare" to ...stage...

Signed and Sealed this

Twenty-first Day of August, 2001

*Attest:*

*Attesting Officer*

NICHOLAS P. GODICI
*Acting Director of the United States Patent and Trademark Office*